(12) United States Patent
Morinaga et al.

(10) Patent No.: US 10,427,543 B2
(45) Date of Patent: Oct. 1, 2019

(54) MOTOR CONTROL APPARATUS AND MOTOR CONTROL METHOD

(71) Applicant: NISSAN MOTOR CO., LTD., Yokohama-shi, Kanagawa (JP)

(72) Inventors: Hatsuki Morinaga, Kanagawa (JP); Yutaka Kobayashi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 62 days.

(21) Appl. No.: 15/327,795

(22) PCT Filed: Jul. 23, 2014

(86) PCT No.: PCT/JP2014/069395
§ 371 (c)(1),
(2) Date: Jan. 20, 2017

(87) PCT Pub. No.: WO2016/013063
PCT Pub. Date: Jan. 28, 2016

(65) Prior Publication Data
US 2017/0203670 A1    Jul. 20, 2017

(51) Int. Cl.
*B60W 10/08* (2006.01)
*B60L 15/20* (2006.01)
(Continued)

(52) U.S. Cl.
CPC ............... *B60L 15/20* (2013.01); *B60L 3/00* (2013.01); *B60L 3/003* (2013.01); *B60L 3/0061* (2013.01); *B60L 3/12* (2013.01); *F16H 63/50* (2013.01); *H02K 9/19* (2013.01); *H02K 11/00* (2013.01); *H02K 11/25* (2016.01); *H02P 27/06* (2013.01);
(Continued)

(58) Field of Classification Search
None
See application file for complete search history.

(56) References Cited

U.S. PATENT DOCUMENTS

| 8,060,266 B2 * | 11/2011 | Hidaka | B60K 6/48 |
| | | | 180/65.31 |
| 2004/0108149 A1 * | 6/2004 | Adachi | B60K 6/26 |
| | | | 180/65.235 |

(Continued)

FOREIGN PATENT DOCUMENTS

| EP | 2 080 660 A1 | 7/2009 |
| JP | 2008-099424 A | 4/2008 |

(Continued)

*Primary Examiner* — Charles A Fox
*Assistant Examiner* — Ryan P Dodd
(74) *Attorney, Agent, or Firm* — Foley & Lardner LLP

(57) ABSTRACT

A motor control apparatus including a motor 1, a transmission 5 disposed adjacent to the motor 1 or in the vicinity of the motor 1, an oil temperature sensor 5 that detects temperature of lubricating oil of the transmission 5, a cooling mechanism that cools a motor with a refrigerant, a refrigerant sensor that detects temperature of the refrigerant, and a controller that controls torque of the motor 1. Further, the controller selects either the lubricating oil temperature detected by the oil temperature sensor 5 or the refrigerant temperature detected by the refrigerant sensor as detected temperature and applies limitation to torque based on the detected temperature.

5 Claims, 5 Drawing Sheets

(51) Int. Cl.
  *B60L 3/00* (2019.01)
  *H02K 11/00* (2016.01)
  *H02K 11/25* (2016.01)
  *H02P 29/60* (2016.01)
  *B60L 3/12* (2006.01)
  *F16H 63/50* (2006.01)
  *H02K 9/19* (2006.01)
  *H02P 27/06* (2006.01)

(52) U.S. Cl.
  CPC ......... *H02P 29/60* (2016.02); *B60L 2240/425* (2013.01); *B60L 2240/485* (2013.01); *B60L 2240/525* (2013.01); *Y02T 10/646* (2013.01); *Y02T 10/7258* (2013.01)

(56) References Cited

U.S. PATENT DOCUMENTS

| | | | |
|---|---|---|---|
| 2009/0258755 A1* | 10/2009 | Kimura | B60L 11/14 477/107 |
| 2013/0151051 A1* | 6/2013 | Inamura | B60W 10/06 701/22 |
| 2015/0224868 A1 | 8/2015 | Makino | |
| 2016/0121876 A1* | 5/2016 | Cho | B60L 3/0061 701/22 |
| 2016/0268955 A1* | 9/2016 | Rao | H02K 15/00 |

FOREIGN PATENT DOCUMENTS

| | | |
|---|---|---|
| JP | 2010-095152 A | 4/2010 |
| JP | 2012-075228 A | 4/2012 |
| JP | 2013-50354 A | 3/2013 |
| JP | 2014-093845 A | 5/2014 |

\* cited by examiner

MOTOR CONTROL APPARATUS AND MOTOR CONTROL METHOD

TECHNICAL FIELD

The present invention relates to a motor control apparatus and motor control method.

BACKGROUND ART

Regarding a vehicle provided with a motor capable of outputting power to a drive shaft, a control method of a power output device as shown in the following is disclosed. In the control method, oil temperature Toil of lubrication cooling oil that lubricates and cools a transmission is detected by a temperature sensor mounted to an oil pan and oil temperature for execution Toil* is set. Then, based on the oil temperature for execution Toil* and coil temperature Tcoil2 of a motor, a load rate R2 of a motor MG2 is set. The load rate R2 is set so as to decrease greatly as the oil temperature for execution Toil* becomes higher when the coil temperature Tcoil2 exceeds a predetermined temperature. A motor torque command Tm2* is set using the load rate R2 set, and drive of the motor is controlled so that torque of the torque command Tm2* is output. In this way, as the oil temperature for execution Toil becomes higher, drive of the motor is greatly controlled (Patent Document 1).

PRIOR ART DOCUMENT

[Patent Document]
[Patent Document 1] JP 2008-99424 A

SUMMARY OF INVENTION

Problems to be Solved by Invention

By the way, in a drive system where lubricating oil and motor of a transmission are arranged in a way they can exchange heat, as temperature of the lubricating oil increases, temperature of cooling water of the motor also increases. More, when the cooling water circulates within an inverter, temperature of an element constituting the inverter also increases. Further, in such drive system, in order to prevent the motor temperature and temperature of the inverter element from becoming high, torque of the motor should be limited in accordance with the motor temperature or temperature of the inverter element.

When the control method disclosed in Patent Document 1 is applied to the above-mentioned drive system by replacing the oil temperature for execution Toil to the temperature of the cooling water, detecting the temperature of the cooling water by the sensor for the cooling water and limiting the drive of the motor more greatly as the detected cooling water temperature becomes high may be considered.

However, as responsiveness of the sensor for the cooling water is insufficient, there was a problem that torque cannot be appropriately limited such as when temperature of the cooling water is raised in a short time.

An object of the present invention is to provide a motor control apparatus and motor control method which can appropriately limit the torque.

Means for Solving Problems

The present invention solves the above problem by selecting lubricating oil temperature detected by an oil temperature sensor or refrigerant temperature detected by a and limiting the torque based on the detected temperature.

Effect of Invention

In the present invention, for the temperature used when limiting torque, lubricating oil temperature is selectable. Accordingly, even under a state in which appropriate torque limitation cannot be performed with a detected value of the refrigerant sensor, a detected value of the oil temperature sensor can be used when performing the torque limitation.

MODES FOR CARRYING OUT THE INVENTION

Hereafter, embodiments of the present invention will be described with reference to the drawings.

Figure 1:
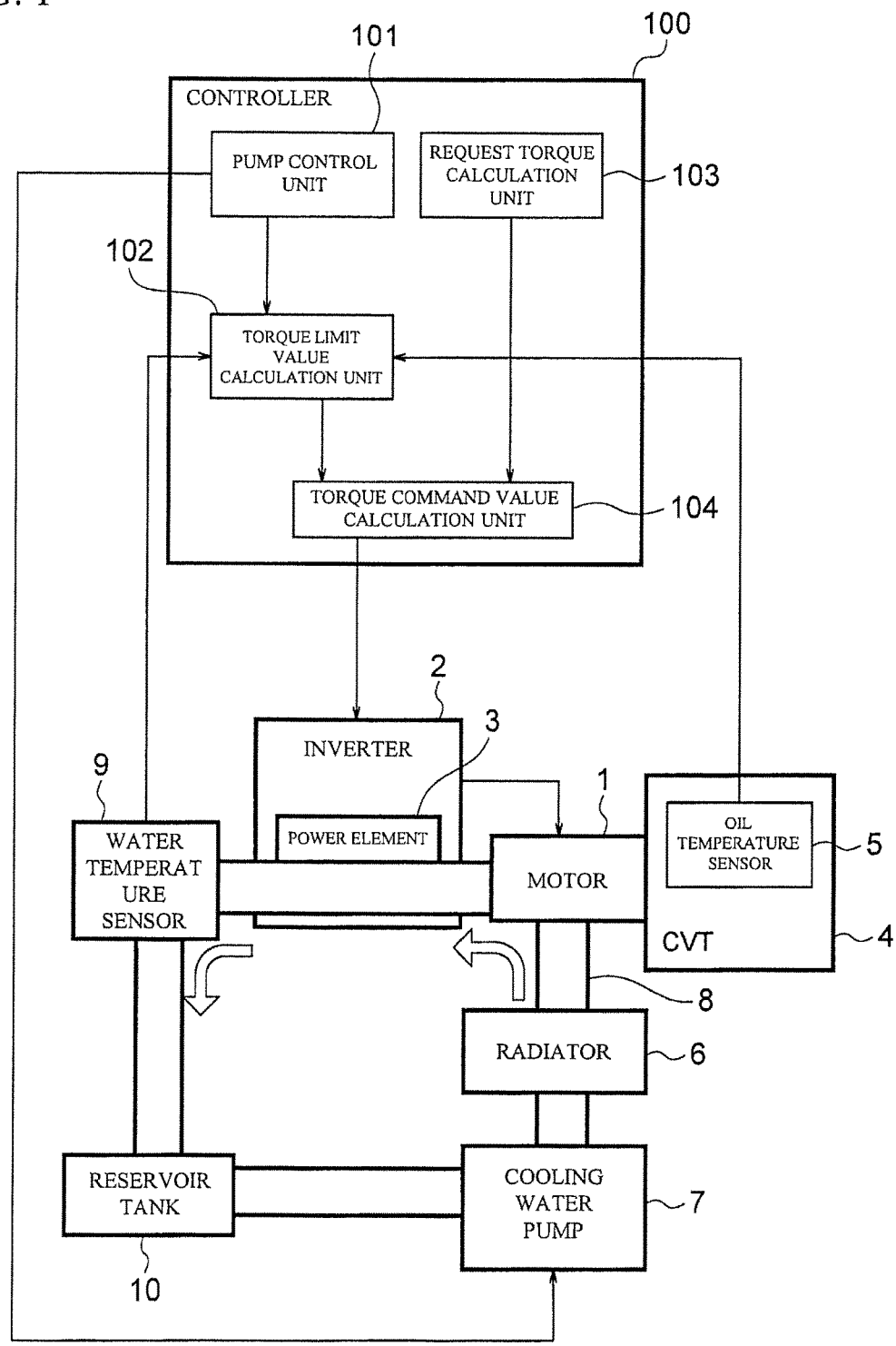
FIG. 1 is a block diagram illustrating a vehicle drive system according to the present embodiment.

FIG. 1 is a block diagram of a drive system of a vehicle according to an embodiment of the present invention. A motor control apparatus according to the present embodiment is applied to a drive system of a vehicle. The vehicle is a vehicle including a motor such as an electric vehicle or hybrid vehicle.

As shown in FIG. 1, the drive system of a vehicle includes a motor 1, an inverter 2, a power element 3, a transmission 4, an oil temperature sensor 5, a radiator 6, a cooling water pump 7, a cooling channel 8, a water temperature sensor 9, a reservoir tank 10, and a controller 100. More, the drive system may include a drive wheel or the like in addition to the configuration illustrated in FIG. 1.

A motor 1 is, for example, a synchronous motor generator which includes a rotor, a permanent magnet embedded in the rotor, a stator and a stator coil wound to the stator. The motor 1 functions as an electric motor and also as a power generator. When three-phase AC power is supplied from the inverter 2, the motor 1 starts rotary driving (power running). Whereas, when the rotor rotates by an external force, the motor 1 generates AC power by generating electromotive force to both ends of the stator coil (regeneration).

The inverter 2 is a conversion circuit for converting power of a vehicle-mounted battery (not shown in figures) to AC power and outputting converted power to the motor 1. The inverter 2 flows current to the motor 1 based on a torque command value sent from the controller 100 in order to generate motor torque. Also, when the motor 1 functions as a power generator, the inverter 2 converts the AC power generated by the motor to DC power and outputs the converted power to the battery. The inverter 2 is connected to the motor 1.

Further, a switching signal based on the torque command value is input to the inverter 2, and the inverter 2 is driven by switching ON and OFF of a switching element according to the switching signal. The switching signal is generated based on the torque command value, the rotational speed or the like of the motor 1. The controller 100 generates the switching signal.

More, the inverter 2 includes a power element 3 in which switching element such as IGBT is modularized. When the inverter 2 is driven, loss of the power element 3 generates heat and temperature of the power element 3 rises. Accordingly, cooling water is circulated so as to lower the temperature of the power element 3.

A transmission 4 is a continuously variable transmission mechanism (CVT) that makes stepless transmission gear ratio by changing contact diameter of a belt running around a plurality of pulleys. An input shaft of the transmission 4 is connected to a rotary shaft of the motor 1 and rotary driving force from the motor 1 is input to the transmission 4. An output shaft of the transmission 4 is connected to a drive wheel through a shaft so as to transmit output rotary driving force from the transmission 4 to the drive wheel.

In order to lubricate or cool machine part of the transmission 4, lubricating oil is flew into the transmission 4. An oil temperature sensor 5 is disposed to the transmission 4. The oil temperature sensor 5 is a sensor to detect temperature of the lubricating oil. The oil temperature sensor 5 outputs a detected value to a controller 100.

A motor 1 is disposed adjacent to the transmission 4 or in the vicinity of the motor 1. The motor 1 and transmission 4 are disposed so that heat is transmitted at least between the motor 1 and transmission 4. As an example of disposing the motor 1 adjacent to the transmission 4, when the motor 1 is included inside the transmission 4, heat exchange is performed between lubricating oil and the motor 1 inside the transmission 4. Also, when the motor 1 and transmission 4 are integrated, the motor 1 and transmission 4 are in a state in which they are disposed adjacent to each other. Further, even when the motor 1 and transmission 4 are disposed with a space interposed therebetween, as far as the heat of the transmission 4 is transmitted to the motor 1, the motor 1 is considered to be disposed in the vicinity of the transmission 4.

The oil temperature sensor 5 is a sensor to detect temperature of lubricating oil. The oil temperature sensor 5 outputs the detected value (detected temperature) to the controller 100.

A radiator 6 is an exchanger to exchange heat of cooling water. A cooling water pump 7 is a mechanical or electrical pump and the cooling water pump 7 is a device to circulate cooling water within a cooling channel 8. The cooling channel 8 is a flow channel to flow the cooling water. The cooling channel 8 is arranged in the motor 1 and inverter 2 so as to exchange heat between the cooling water and motor 1 and so as to exchange heat between the cooling water and power element 3. More, the cooling channel 8 is formed by a circulation channel in order to circulate cooling water through the motor 1, inverter 2, water temperature sensor 9, and reservoir tank 10.

The water temperature sensor 9 is a sensor to detect temperature of the cooling water. The water temperature sensor outputs a detected value (detected temperature) to the controller 100. The reservoir tank 10 is a tank to store the cooling water.

The controller 100 is a controller to control the entire vehicle and the controller 100 controls motor 1, inverter 2, and cooling water pump 7. The controller 100 is provided with a ROM in which various programs are stored, a CPU as an operation circuit to execute programs stored in the ROM, and RAM such as an accessible memory device, etc. The controller 100 also includes a pump control unit 101, torque limit value calculation unit 102, request torque calculation unit 103, and torque command value calculation unit 104, as a functional block for controlling the motor 1, inverter 2, and cooling water pump 7.

Incidentally, the transmission 4 generates heat while a vehicle is driven. After that, when the vehicle is parked and the main switch is turned off, temperature of the transmission 4 becomes high. As heat is transmitted between the motor 1 and transmission 4, while the vehicle is parked, heat transmits from the transmission 4 to the motor 1 and cooling water inside the motor 1 heats up. Then, in the next driving, when the main switch is turned on and when the cooing water pump 7 starts driving, heated cooling water inside the motor 1 flows into the inverter 2. Accordingly, at the start of vehicle driving, a state of the temperature of the power element 3 or temperature of a coil of the like of the motor 1 becomes high. Subsequently, when the motor 1 is driven, under such conditions in which the temperature is high and the motor 1 is driven so as to satisfy high request torque, temperature of the power element 3 or the like becomes even higher.

To suppress temperature of the power element 3 or the like, limitation should be applied to the torque of the motor according to the temperature of the cooling water. As a control method for torque limitation, a torque limit value is set, and when the request torque is higher than the torque limit value, the torque command value is restricted to the torque limit value. In this way, limitation is applied to the request torque.

However, there is a delay in response time of the water temperature sensor 9. When the cooling water pump 7 starts driving and heated cooling water flows to the water temperature sensor 9, the water temperature sensor 9 cannot detect water temperature following the temperature rise. Thus, the temperature detected by the water temperature sensor 9 becomes lower than actual temperature of the cooling water. Accordingly, there is a problem that torque limitation becomes insufficient when limitation is applied to the output torque of the motor 1 based on the detected value by the water temperature sensor 9.

Further, as another method of torque limitation, a method of making the torque limit value constant for a certain period after start of driving of the cooling water pump 7 can be considered. In order to not allow temperature of the power element 3 or the like to exceed the allowable temperature even when cooling water of the highest temperature expected flows inside the cooling channel 8 from the motor 1 after start of driving of the cooling water pump 7, the constant torque limit value should be set to a low value in advance. However, occurrence frequency of the cooling water to become higher than the expected temperature is low. Accordingly, there is a problem that torque limitation is executed for more than expected for a certain period of time.

Figure 2:
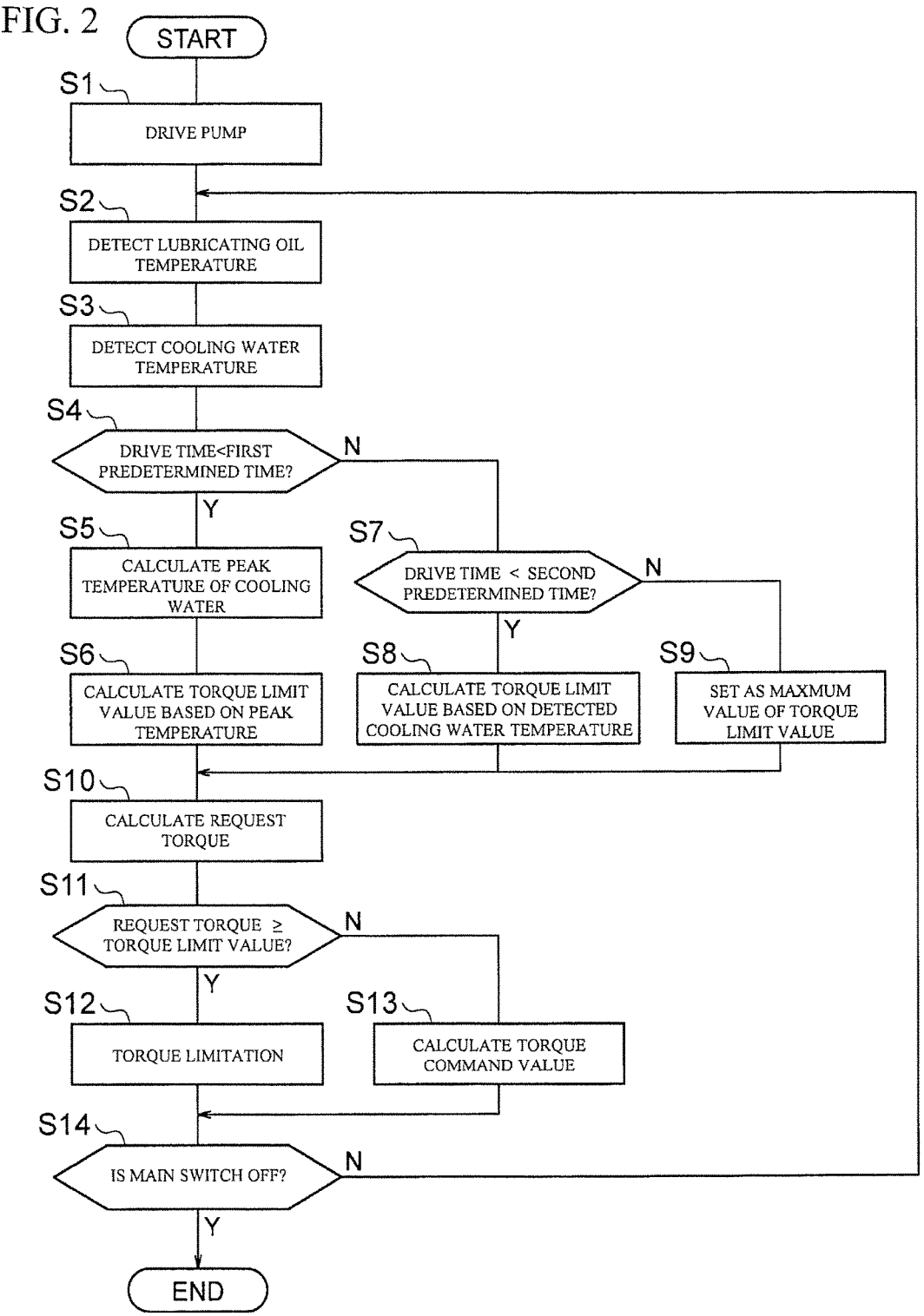
FIG. 2 is a flowchart illustrating a control flow of the vehicle drive system.
Figure 3:
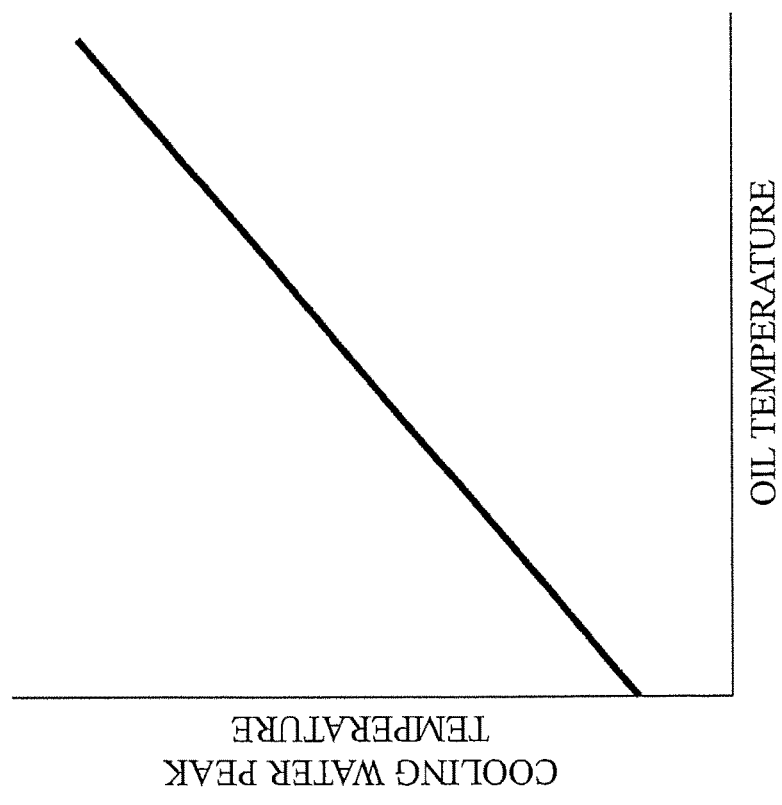
FIG. 3 is a graph illustrating characteristics of peak temperature of cooling water relative to oil temperature.
Figure 4:
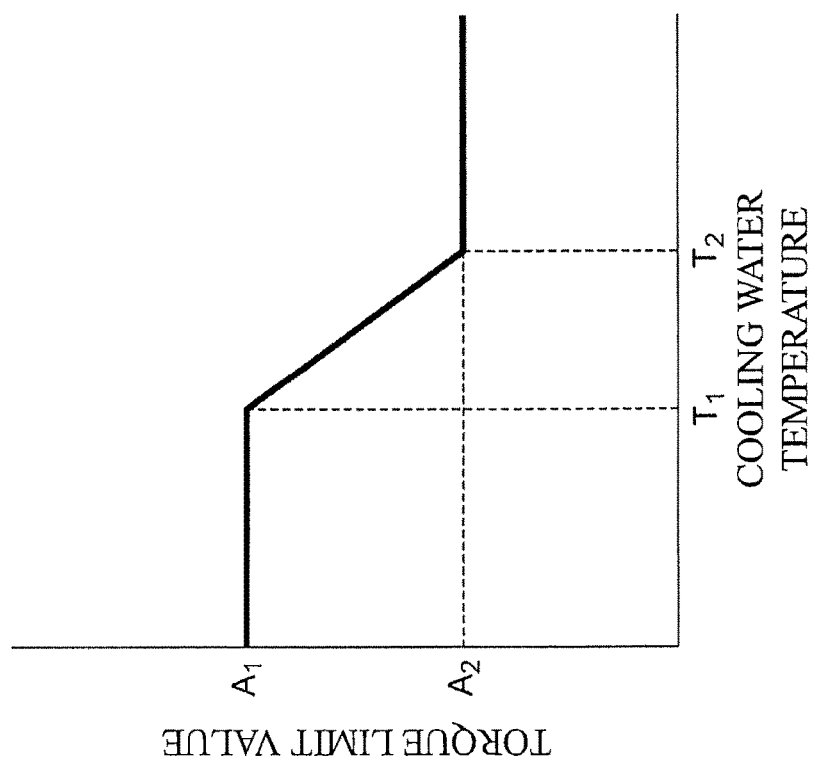
FIG. 4 is a graph illustrating characteristics of a torque limit value relative to a cooling water temperature.

In the present embodiment, to solve the above problems, the following control is performed. Referring to FIG. 2 to FIG. 4, control of a vehicle drive system is explained. FIG. 2 is flowchart illustrating a control flow of a controller 100. FIG. 3 is a graph illustrating a relationship between temperature of lubricating oil (oil temperature) and peak temperature of cooling water. FIG. 4 is a graph illustrating a relationship between temperature of cooling water (cooling water temperature) and torque limit value.

When a main switch of a vehicle is switched from OFF to ON while a vehicle is parked, a control flow illustrated in FIG. 2 starts. In step S1, a pump control unit 101 sends a drive command to a cooling water pump 7. The cooling water pump 7 starts driving upon receipt of the drive command. Cooling water circulates inside the cooling channel 8.

In step S2, the oil temperature sensor 5 detects temperature of the lubricating oil. A torque limit value calculation unit 102 obtains temperature of the lubricating oil from the oil temperature sensor 5. In step S3, the water temperature sensor 9 detects temperature of the cooling water. The torque limit value calculation unit 102 obtains temperature of the cooling water from the water temperature sensor 9.

In step S4, the torque limit value calculation unit 102 compares lengths of drive time of the cooling water pump 7 with first predetermined time. The drive time of the cooling water pump 7 is the time elapsed from the start of the cooling water pump 7 driving to the present time. The first predetermined time is the time set in advance in accordance with a delay time of detection by the water temperature sensor 9. Once the cooling water pump 7 is driven, when temperature of the cooing water rapidly changes, a time is required until the detected value by the water temperature sensor 9 reaches actual temperature of the cooling water. The first predetermined time indicates the time required until the detected value by the water temperature sensor 9 reaches the actual temperature of the cooling water from the start of driving of the cooling water pump 7. In other words, the first predetermined time is a time which represents a state of having a difference between the detected value by the water temperature sensor 9 and the actual temperature of the cooling water represented in time when the water temperature sensor 9 cannot follow the temperature changes due to rapid change of the cooling water temperature. Additionally, when setting the length of the first predetermined time, the time required to completely match the detected value by the water temperature sensor 9 and the actual temperature of the cooling water should not necessarily be set as the first predetermined time. The time required to become a state in which the difference between the detected value by the water temperature sensor 9 and the actual temperature of the cooing water is small may be set as the first predetermined time.

Next, when the length of drive time of the cooling water pump 7 is shorter than the first predetermined time, the torque limit value calculation unit 102 determines that the actual temperature of the cooling water is higher than the detected value by the water temperature sensor 9 and the process proceeds to step S5. In other words, when temperature of the cooling water changes rapidly before the drive time reaches the first predetermined time, the water temperature sensor 9 cannot detect the actual cooling water temperature immediately. Accordingly, the torque limit value calculation unit 102 assumes from the drive time that the actual temperature is higher than the detected value by the water temperature sensor 9.

In step S5, the torque limit value calculation unit 102 references a first map and calculates a peak temperature of the cooling water that corresponds to the temperature of the lubricating oil detected by the oil temperature sensor 5. The peak temperature of the cooling water indicates the maximum temperature of the cooling water under the actual temperature of the lubricating oil. When temperature of the lubricating oil is high, then temperature of the transmission 4 is also high. Further, heat of the transmission 4 is transmitted to the motor 1 and temperature of the cooling water becomes high. In other words, temperature of the lubricating oil and the temperature of the cooling water are correlated and the higher the temperature of the lubricating oil is, the higher the peak temperature of the cooling water becomes once the cooling water pump 7 is driven.

The torque limit value calculation unit 102 stores a first map which indicates a relative relationship between temperature of the lubricating oil and peak temperature of the cooling water. The relative relationship can be represented by a graph shown in FIG. 3 and is the relationship in which the higher the temperature of the lubricating oil is, the higher the peak temperature of the cooling water becomes.

In step S6, the torque limit value calculation unit 102 calculates, while referencing a second map, a torque limit value which corresponds to the peak temperature of the cooling water. The torque limit value calculation unit 102 stores a second map which indicates the relative relationship between the temperature of the cooling water and the torque limit value. The relative relationship can be represented by a graph shown in FIG. 4. When temperature of the cooling water is lower than $T_1$, the torque limit value becomes a constant value ($A_1$). When the temperature of the cooling water is $T_1$ or over and $T_2$ or lower, as the temperature of the cooling water becomes high, the torque limit value becomes low between the range of $A_1$ to $A_2$. When temperature of the cooling water is higher than $T_2$, the torque limit value becomes a constant value ($A_2$). The torque limit value $A_1$ is higher than the torque limit value $A_2$. Further, the relative relationship between the temperature of the cooling water and the torque limit value is not limited to the relationship shown in FIG. 4, and may be a relationship shown in other characteristics.

The torque limit value calculation unit 102 assigns the peak temperature of the cooling water to the temperature of the cooling water indicated in the second map for calculating the torque limit value. The torque limit value calculation unit 102 outputs the torque limit value to a torque command value calculation unit 104. Then, the process proceeds to step S10.

In this way, when the length of drive time of the cooling water pump 7 is shorter than the first predetermined time, the torque limit value calculation unit 102 selects the detected value of the oil temperature sensor 5 between the temperature of the lubricating oil detected by the oil temperature sensor 5 and the temperature of the cooling water detected by the water temperature sensor 9. Then, the torque limit value calculation unit 102 calculates, based on the detected value selected, a torque limit value.

In step S4, when the length of drive time of the cooling water pump 7 is equal to the first predetermined time or longer, the process proceeds to step S7. In step S7, the torque limit value calculation unit 102 compares the drive time with the second predetermined time. The second predetermined time indicates the length of time that the temperature of the cooling water becomes the design water temperature or lower. For example, the design water temperature may be set to an upper limit temperature of the cooling water assumed in ordinary driving of a vehicle.

When the length of drive time is shorter than the second predetermined time, the process proceeds to step S8. In step S8, the torque limit value calculation unit 102 calculates, while referencing the second map, a torque limit value that corresponds to the detected value by the water temperature sensor 9. The torque limit value calculation unit 102 assigns the detected value by the water temperature sensor 9 to the temperature of the cooling water indicated in the second map for calculating the torque limit value. The torque limit value calculation unit 102 outputs the torque limit value to the torque command value calculation unit 104.

Subsequently, when the length of drive time of the cooling water pump 7 is equal to the first predetermined time or longer, the torque limit value calculation unit 102 selects the temperature of the cooling water detected by the water temperature sensor 9 between the temperature of the lubricating oil detected by the oil temperature sensor 5 and the temperature of the cooling water detected by the water temperature sensor 9. Then, the torque limit value calculation unit 102 calculates a torque limit value based on the detected value selected.

In step S7, when the length of drive time of the cooling water pump 7 is equal to the second predetermined time or longer, the process proceeds to step S9. In step S9, the torque limit value calculation unit 102 sets the maximum output torque value of the motor 1 to the torque limit value. The torque limit value calculation unit 102 outputs the torque limit value to the torque command value calculation unit 104. In this way, torque limitation based on the temperature of the cooling water or temperature of the lubricating oil is released. Then, the process proceeds to step S10.

In step S10, a request torque calculation unit 103 calculates, based on an accelerator opening, torque to be requested to the motor 1 as request torque. The request torque calculation unit 103 outputs the request torque to the torque command value calculation unit 104.

In step S11, the torque command value calculation unit 104 compares the request torque with torque limit value. When the request torque is equal to the torque limit value or greater, the torque command value calculation unit 104 calculates a torque limit value as a torque command value in step S12, and outputs the torque command value to the inverter 2. In this way, the request torque is limited to the torque limit value.

Whereas, when the request torque is lower than the torque limit value, in step S13, the torque command value calculation unit 104 calculates request torque as a torque command value without performing torque limitation and outputs the torque command value to the inverter 2.

In step S14, the controller 100 determines whether or not the main switch is in an OFF state. When the main switch is in an ON state, the process proceeds to step S2. Then, while the ON state of the main switch continues, the control flow of step S2 to step S14 is repeatedly performed. When the main switch is in an OFF state, the control flow ends.

Further, in the control flow in step S9, when releasing torque limitation, the torque command value calculation unit 104 may smoothly perform torque release by gradual change processing. For example, when the length of drive time of the cooling water pump 7 is equal to the second predetermined time or over, the process proceeds to step S9 and torque limitation is released. At this time, the torque limit value calculation unit 102 performs the following processing without changing the torque limit value set in step S8 by a previous control flow to the maximum value of the output torque. First, the torque limit value calculation unit 102 calculates temperature of the cooling water by performing gradual change processing to the detected value of the cooling water. For the gradual change processing, smoothing processing may be used for example. The calculated temperature of the cooling water smoothly transits relative to elapse of time. Then, the torque limit value calculation unit 102 inputs the calculated temperature of the cooling water to the second map and calculates a torque limit value.

In other words, when releasing torque limitation according to the temperature of the cooling water, gradual change processing is performed to the cooling water temperature and also torque limitation is performed based on the temperature after performing the gradual change processing. Then, once the torque limitation is performed, the torque limitation is released. In this way, even when the drive time of the cooling water pump 7 reaches the second predetermined time, torque limitation is not immediately released and rapid change in the torque command value can be suppressed. As a result, lowering of operability of the vehicle can be avoided.

On the other hand, when the length of drive time of the cooling water pump 7 is shorter than the second predetermined time, torque limitation is performed in accordance with the cooling water temperature. When performing the torque limitation, the torque limit value calculation unit 102 does not the perform gradual change processing to the cooling water temperature. In this way, when the torque limitation is performed, torque can be immediately limited and thus motor 1 or inverter 2 can be protected from heat.

Figure 5:
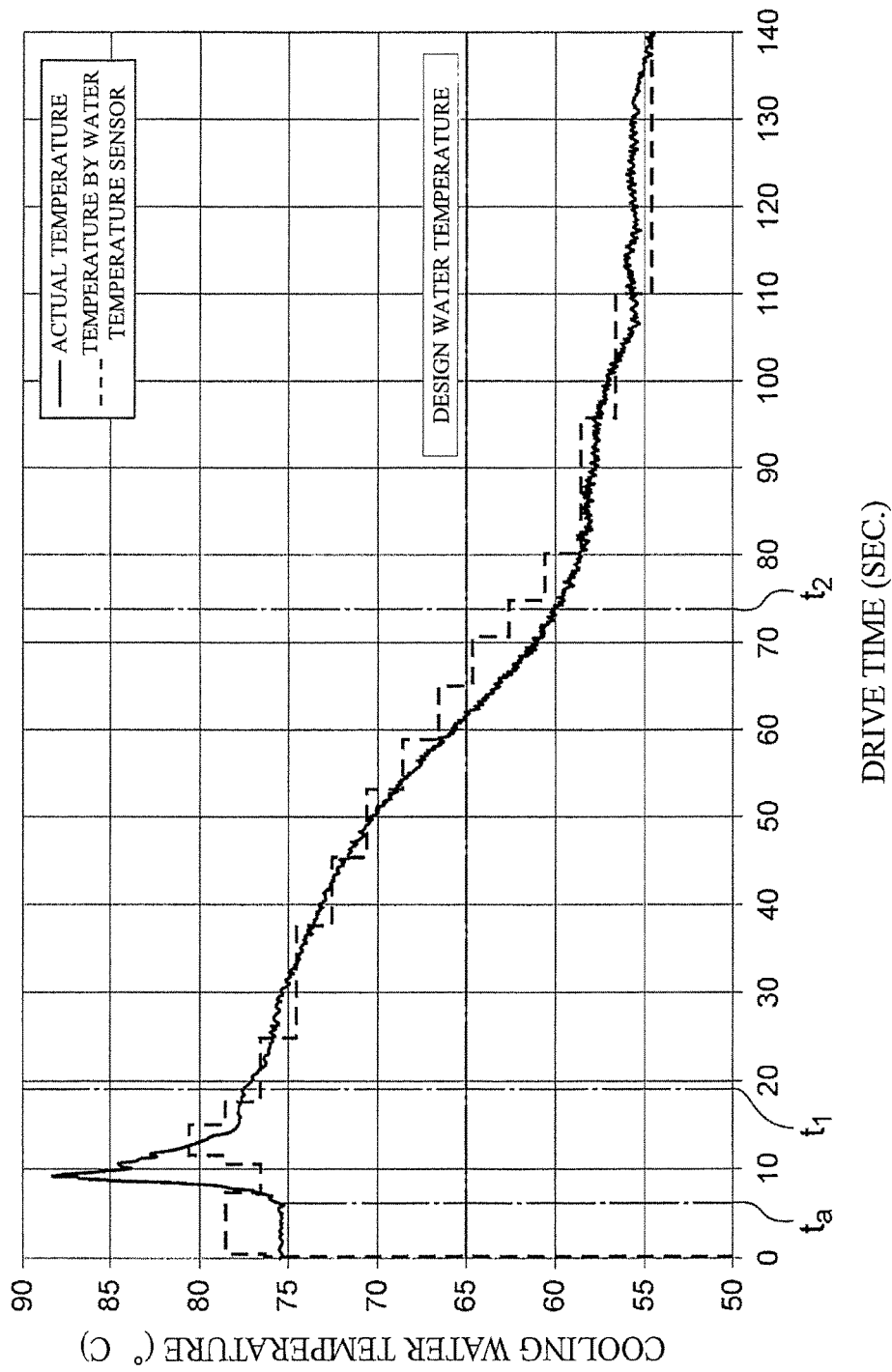
FIG. 5 is a graph illustrating transition of actual cooling water temperature and transition of a detected value of a water temperature sensor.

Next, while indicating transition of cooling water temperature and transition of detected values by the water temperature sensor 9 in FIG. 5, control of the controller 100 is explained. Temperature transition is the transition after start of driving of the cooling water pump 7. A horizontal axis in FIG. 5 indicates the length of drive time of the cooling water pump 7 and a vertical axis indicates temperature of the cooling water (cooling water temperature). A dotted line graph indicates detected values by the water temperature sensor 9 (water temperature sensor temperature) and a solid line graph indicates actual temperature of the cooling water. Further, time $t_1$ represents the first predetermined time and time $t_2$ represents the second predetermined time.

When driving of the cooling water pump 7 starts and the length of drive time becomes time $t_a$, cooling water heated by heat of the transmission 4 flows to the motor 1 and inverter 2. Accordingly, temperature of the cooling water circulating the cooling channel 8 rises. The water temperature sensor 9 cannot follow rapid temperature change of the cooling water. Until the drive time reaches the first predetermined time $t_1$, difference between the actual cooling water temperature and the detected value by the water temperature sensor 9 becomes large.

Unlike the present embodiment, when torque limitation is performed in accordance with a detected value by the water temperature sensor 9 in a state in which the length of drive time is shorter than the first predetermined time $t_1$, since the detected value is low, the torque limit value is set to a high value as shown in FIG. 4. As a result, appropriate torque limitation is not applied. On the other hand, in the present embodiment, the torque limit value calculation unit 102 selects, when calculating a torque limit value, a detected value of the oil temperature sensor 5 and calculates a torque limit value based on the detected value of the oil temperature sensor 5. In this way, torque limit value is set to a low value and appropriate torque limitation can be performed.

When the length of drive time exceeds the first predetermined time $t_1$, change in cooling water temperature becomes slow and a detected value by the water temperature sensor 9 starts to follow the actual temperature. The torque limit value calculation unit 102 selects, when calculating a torque limit value, a detected value by the water temperature sensor 9 and calculates a torque limit value based on the detected value by the water temperature sensor 9. In this way, once the cooling water temperature becomes stable, torque limitation can be performed according to the actual cooling water temperature.

When the length of drive time exceeds the second predetermined time $t_2$, torque limitation in accordance with the cooling water temperature is released as the cooling water temperature becomes lower than the design temperature.

In the present embodiment, the controller 100 selects either the temperature of the lubricating oil detected by the oil temperature sensor 5 or the cooling water temperature detected by the water temperature sensor 9 and applies limitation to torque based on the selected temperature. In this way, for example, even when appropriate torque limitation cannot be applied with torque limitation based on the detected value by the water temperature sensor 9, torque limitation can be applied by using a detected value of the oil temperature sensor 5. As a result, appropriate torque limitation can be performed.

More, in the present embodiment, when the controller 100 determines that the actual cooling water temperature is in a state where it is higher than a detected value of the water temperature sensor 9, the controller 100 applies limitation to the torque based on the selected value while selecting the detected value of the oil temperature sensor 5. In this way, for example, in a state in which cooling water temperature rises in a short time and actual cooling water temperature is higher than the detected value of the water temperature sensor 9, torque limitation can be appropriately performed.

Moreover, although water is used as a refrigerant to cool the motor 1 or power element 3 in the present embodiment, the refrigerant may be another refrigerant other than water.

The above-mentioned controller corresponds to a "controller" of the present invention. The cooling water pump 7, cooling channel 8, and reservoir tank 10 correspond to "cooling mechanism" of the present invention. The water temperature sensor 9 corresponds to a "refrigerant sensor" of the present invention.

DESCRIPTION OF REFERENCE NUMERALS

1 . . . Motor
2 . . . Inverter
3 . . . Power element
4 . . . Transmission
5 . . . Oil temperature sensor
7 . . . Cooling water pump
8 . . . Cooling channel
9 . . . Water temperature sensor
10 . . . Reservoir tank
100 . . . Controller

The invention claimed is:

1. A motor control apparatus comprising:
a motor;
a transmission disposed adjacent to the motor or in a vicinity of the motor;
an oil temperature sensor configured to detect a temperature of lubricating oil of the transmission;
a cooling mechanism configured to cool the motor with a refrigerant;
a refrigerant sensor configured to detect a temperature of the refrigerant; and
a controller configured to control a torque of the motor, wherein the controller:
limits the torque of the motor based on the temperature of the lubricating oil detected by the oil temperature sensor when an elapsed time since the cooling mechanism drives is shorter than a predetermined time, and
limits the torque of the motor based on the temperature of the refrigerant detected by the refrigerant sensor when the elapsed time is longer than the predetermined time.

2. The motor control apparatus according to claim 1, wherein the controller:
limits the torque without conducting a gradual change processing to the temperature of the refrigerant detected by the refrigerant sensor when the torque is limited based on the temperature of the refrigerant; and
conducts the gradual change processing to the temperature of the refrigerant and releases a limitation on the torque after limiting the torque based on the temperature of the refrigerant.

3. A motor control method for controlling torque of a motor, comprising:
detecting a temperature of lubricating oil of a transmission disposed adjacent to the motor or in a vicinity of the motor;
detecting a temperature of refrigerant configured to cool the motor;
cooling the motor using the refrigerant;
applying a limitation to the torque of the motor, wherein applying the limitation to the torque of the motor comprises:
limiting the torque based on the temperature of the lubricating oil when an elapsed time since driving the cooling is shorter than a predetermined time, and
limiting the torque of the motor based on the temperature of the refrigerant when the elapsed time since driving the cooling is longer than the predetermined time.

4. The motor control apparatus according to claim 1, wherein the cooling mechanism comprises a cooling water pump.

5. The motor control apparatus according to claim 4, wherein the cooling mechanism further comprises a cooling channel and a reservoir tank.

* * * * *